Figure 3:
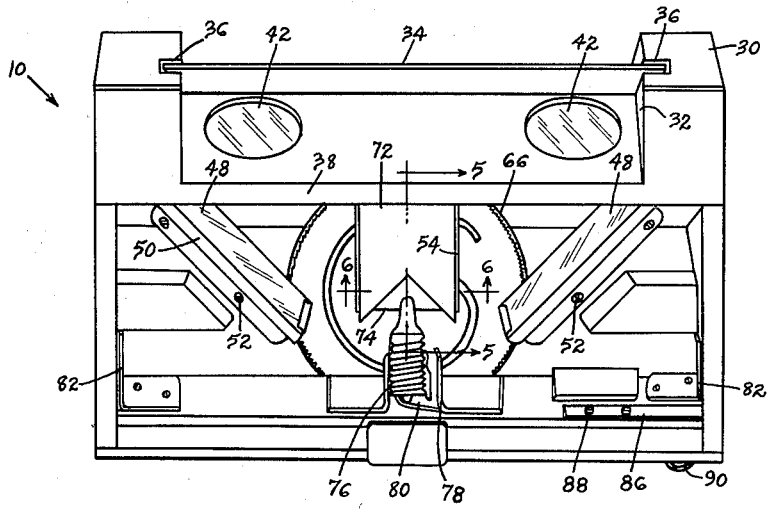

Oct. 4, 1960 S. DOMESHEK 2,954,720
RANGEFINDER WITH ADJUSTABLE RETICLE
Filed Dec. 9, 1954 4 Sheets-Sheet 1
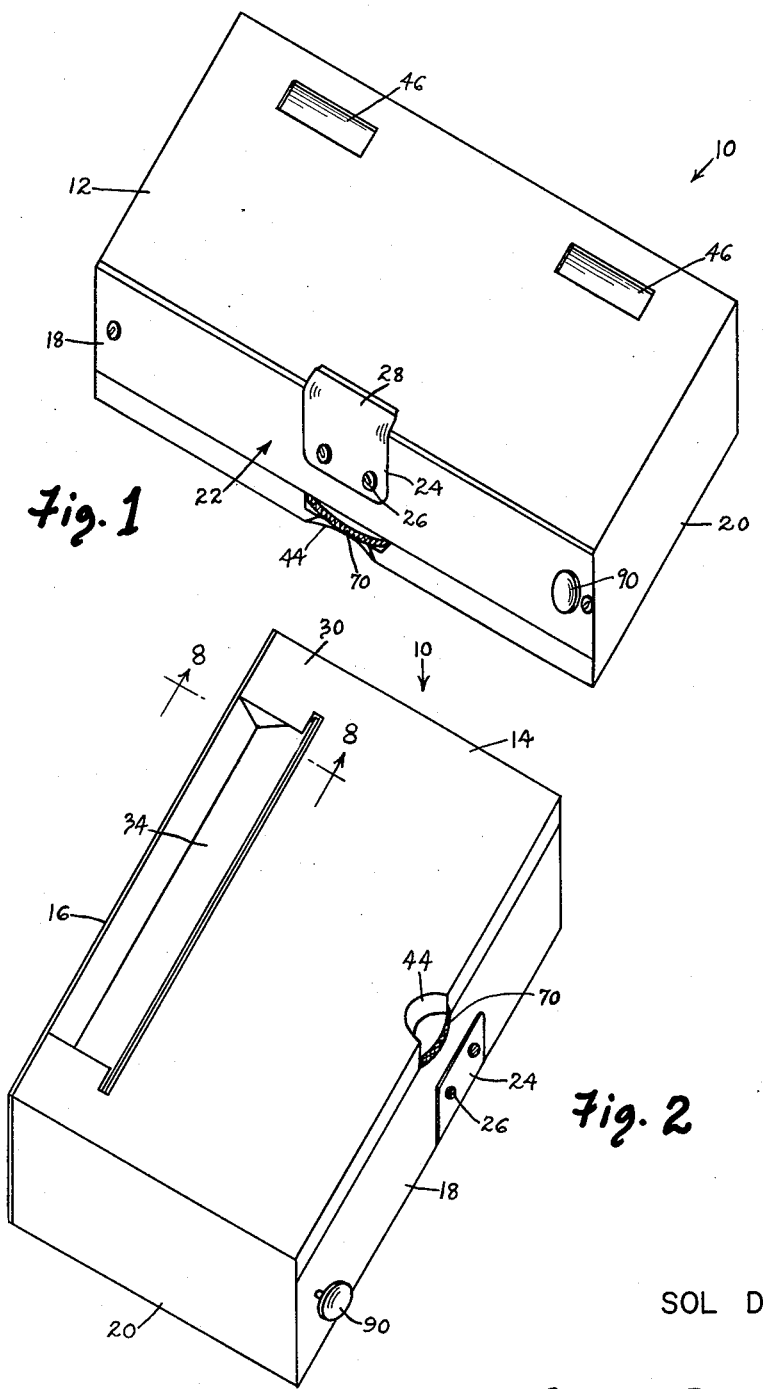
INVENTOR
SOL DOMESHEK
BY Louis B. Applebaum
ATTORNEYS Oct. 4, 1960 S. DOMESHEK 2,954,720
RANGEFINDER WITH ADJUSTABLE RETICLE
Filed Dec. 9, 1954 4 Sheets-Sheet 2

INVENTOR
SOL DOMESHEK

BY Louis B. Applebaum
ATTORNEYS

INVENTOR
SOL DOMESHEK

BY Louis B. Applebaum
ATTORNEYS

Oct. 4, 1960 S. DOMESHEK 2,954,720
RANGEFINDER WITH ADJUSTABLE RETICLE
Filed Dec. 9, 1954 4 Sheets-Sheet 4
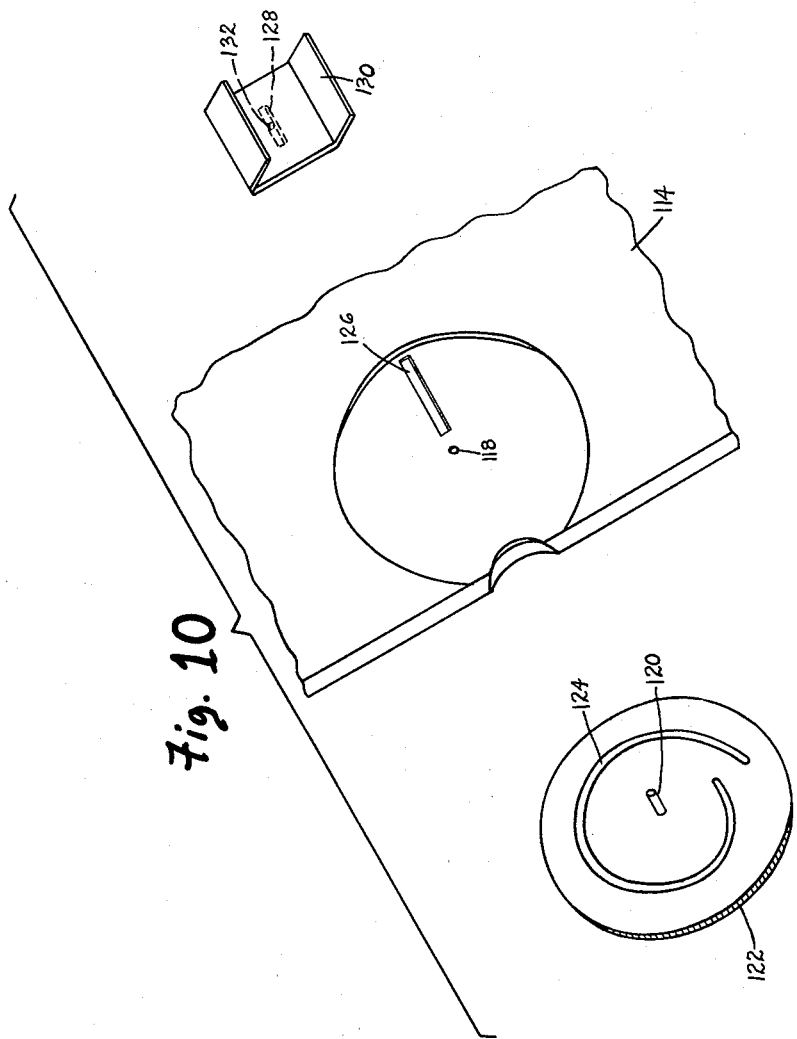
*INVENTOR*
SOL DOMESHEK
BY *Louis B. Applebaum*
ATTORNEYS

United States Patent Office 2,954,720
Patented Oct. 4, 1960

2,954,720

RANGEFINDER WITH ADJUSTABLE RETICLE

Sol Domeshek, 160 S. Middleneck Road,
Great Neck, N.Y.

Filed Dec. 9, 1954, Ser. No. 474,306

6 Claims. (Cl. 88—2.6)

(Granted under Title 35, U.S. Code (1952), sec. 266)

The invention described herein may be manufactured and used by or for the Government of the United States of America for governmental purposes without the payment of any royalties thereon or therefor.

The invention relates to a pocket size ranging device capable of directly measuring the distance between an object and the observer, and covers particularly the presentation of a ranging reticle which may be adjusted to lie in the same plane normal to the visual axis as the object being viewed. By suitably calibrated means, the distance is then read directly.

It is desirable to provide a simple, yet effective means for observing an object at a distance, and for accurately determining that distance from the observer. Design complexity and cost has always been a major problem in ranging devices. The device of the invention avoids these difficulties by employing a simple assembly of reflecting and refracting elements, and reticle whereby visual ranging and training in visual ranging is possible in a simple, yet efficient manner. It has been found that the device of the invention is capable of use in training military personnel during maneuvers to more accurately determine range. It has many similar uses, as for engineers, sportsmen, and sailors, and is an excellent means for teaching children to determine distance accurately. This is due to its simplicity of operation, and, in this application, acts as an educational toy. Since the movable parts and optical elements have been reduced to a minimum, the problem of maintenance has been minimized to that required for a battery-powered flash light.

A primary object of the invention is to provide a pocket-size device that is capable of visually measuring distance between an object and the observer.

Another important object of the invention is to provide a simple, inexpensive teaching and training device, thereby placing it within the means of military and civilian schools and individuals.

Still another object of the invention is to obtain a stereoscopic viewing and ranging device that contains a minimum of parts.

A feature of the invention resides in the use of a single, illuminated reticle plate in combination with a pair of reflecting elements. By this combination, the single reticle plate is made to present two reticles, one to each eye of the observer.

Another feature of the invention resides in the provision of direct linear motion of the reticle plate whereby the two visual reticles are made to appear to have equal and opposite motion, toward or away from each other, depending on the direction of motion of the reticle plate with respect to the reflecting elements.

Yet another feature of the invention concerns the use of a rotating cam plate which has been graduated for ranging in distance units. In this manner, only a single element, the cam, both controls parallax separation of the visual reticles and provides the corresponding ranges.

And still another feature of the invention resides in the construction of the reticle plate so that it may be moved linearly as the controlling cam plate is rotated.

Figure 7:
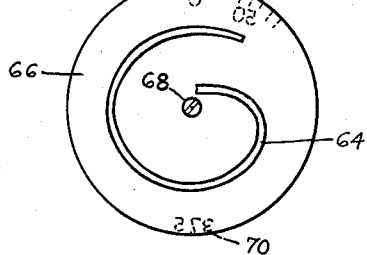
Figure 9:
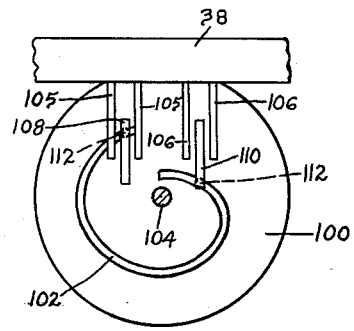
Figure 4:
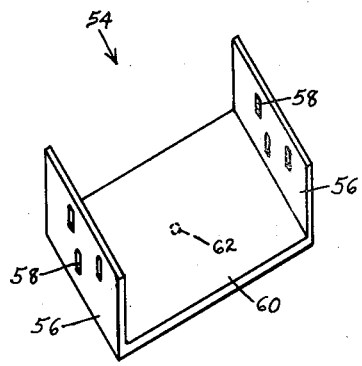
Figure 6:
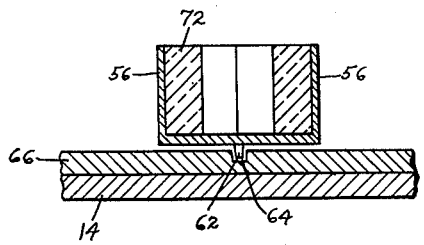
Figure 5:
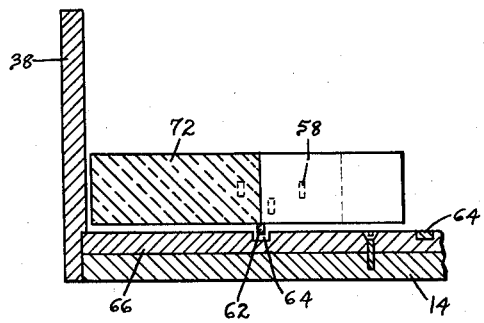
Figure 8:
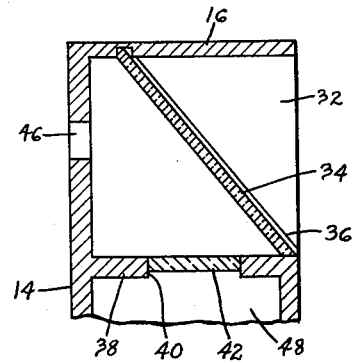

Other objects and many of the attendant advantages of this invention will be readily appreciated as the same becomes better understood by reference to the following detailed description when considered in connection with the accompanying drawings wherein:

Fig. 1 is a perspective rear view of the invention and shows the aperture slots for the eyes, Fig. 2 is a front perspective view of the device of the invention, Fig. 3 is a view of the invention similar to that of Fig. 1 with the back panel removed to disclose the structure therein, Fig. 4 is a perspective view of a preferred form of reticle, Fig. 5 is a section taken on line 5—5 of Fig. 3, Fig. 6 is a section taken on line 6—6 of Fig. 3, Fig. 7 is a plan view of the cam plate, Fig. 8 is an enlarged fragmentary section taken on line 8—8 of Fig. 2 and illustrates the mounting of the partial reflection and transmission element, Fig. 9 discloses another form of reticle plate and control, structure, and Fig. 10 is an exploded fragmentary view of another means for mounting the cam plate.

Referring to Figs. 1 to 8, housing 10 may be in rectangular form and is constructed of any suitable material, such as wood, metal or plastic. Housing 10 comprises a removable back panel 12, a front panel 14, top and bottom panels or plates 16 and 18, respectively, and side panels 20.

Retaining bracket 22 is L-shaped, with one arm 24 secured at 26 to the bottom panel 18. Arm 28 extends upwardly for a short distance along the length of back panel 12 and assists in holding the panel in position. In the illustrated form, top panel 16 is integral with rear panel 12 and is adapted to be removed as a unit therewith. Top panel 16 is secured by any desired fastening means to an enlarged section 30 of side panels 20. Section 30 serves as a securing means and also as a support for panel 16.

Front panel 14 is provided with an elongated slot 32 extending across the upper edge of the panel 14, extending down from the top of panel 14 for a short distance beneath top panel 16, and terminating at the thickened supporting portions 30.

As is shown in Fig. 8, slot 32 provides a space to receive a partially transmitting reflecting element 34, the active surface being held in a plane 45° to the normal such as by means of grooves 36 cut into the sides of thickened portions 30. A transverse partition bar 38 extends across the housing beneath reflecting element 34 in spaced parallel relation to the top and bottom panels 16 and 18. The lower edge of reflecting element 34 rests on partition 38, which thus acts as a base support therefor. In addition, partition bar 38 contains circular openings 40 to mount focusing lenses 42 therein. On the opposite end bottom of front panel 14 is a semi-circular slot 44, for a purpose that will presently be made clear.

A pair of slots or eye apertures 46 in back panel 12 are located in directly opposed relationship to inclined partially-transmitting reflecting element 34. Reflecting element 34 is therefore positioned at 45° in relation to both lenses 42 and eye apertures 46. The reticle images projected by focusing lenses 42 are reflected back by reflecting element 34 through eye apertures 46. The reticle images from reticle plate 54 are reflected by the pair of reflecting elements or mirrors 48, supported in casing 50 and secured by means of screws 52 to the front panel 14 of housing 10. The active surfaces of reflecting elements 48 are positioned at 45° angles with respect to the reticle planes and with respect to the principal planes of lenses 42 to reflect each reticle through its respective lense 42.

The pair of reticle patterns are the distance measuring means and act as a stereoscopic reference mark to intercept the lines of sight from an object to the observer's eyes. This reference image can be produced in several forms. In Figs. 4 to 7, one such form of reticle plate 54 is illustrated in detail. Reticle plate 54 may be U-shaped with parallel arms 56 containing reticle patterns 58. These patterns are in parallel, opposed relation. To provide the U-shape, arms 56 are connected by crosspiece 60, which retains a pin 62 at the center thereof. Pin 62 extends from the surface of crosspiece 60 facing plate 14, and rides in track or groove 64 on cam plate 66. Cam plate 66 is in position in housing 10 by securing means 68. Cam track 64 is spiral in construction and is designed in the illustrative form of the invention for a visual range from about 3 feet to 750 feet, the latter distance being the normal limit for stereoscopic vision. Indicia 70 to indicate the range are provided on the surface of cam 66 adjacent the periphery thereof.

In the operation of the reticle plate 54, it is necessary to convert the rotary motion of cam plate 66 to a linear movement of the reticle plate 54. Since pin 62 rides in groove 64, radius of groove 64 must increase or decrease as cam plate 66 is rotated. This is obtained by determining the advance in radius required from one end of the curve to the other as well as determining the outside diameter upon which to put the curve. This information provides the inside and outside radius. Thus, for each theta degrees of rotation, the pin 62 moves a distance. Therefore, if it is determined that with a radius of one inch available, a maximum movement of one quarter inch is desired, this will give a three-quarter inch radius as the minimum radius. In laying out the spiral then, at zero degrees, the radius equals one inch. With a 90° rotation of the knurled edge of the cam plate, the radius is reduced one fourth of the quarter inch maximum movement, to obtain a radius of fifteen sixteenths of an inch (¼×¼=1/16; 1 inch minus 1/16=15/16). Successive rotations through 180°, 270° and 360° will yield radii of ⅞, 13/16, and ¾ inch respectively. By connecting these plotted points, the curve of the spiral track is obtained.

To complete the conversion of cam rotation to reticle linear movement in the illustrative form of the invention, reticle plate 54 moves linearly along guide block 72, the latter being permanently secured to partition bar 38. Block 72 is so constructed that the parallel arms 56 of reticle plate 54 extend around the sides thereof, while the connecting member 60 lies between block 72 and cam plate 66 with pin 62 riding in cam track 64. Thus, on rotation of cam plate 66 in a direction to cause reticle plate 54 to move toward base plate 18, the pair of reticle patterns 58 draw closer together and the stereoscopic reticle image appears to be moving toward the observer. Rotation of the cam plate in the opposite direction has a reverse effect, and the stereoscopic reticle image appears to be moving away from the observer.

Guide block 72 is of transparent material and is provided with a deep recess 74 intermediately thereof to allow a light source, lamp 76, to be placed in close proximity to, and illuminate reticle patterns 58. To insure against undue scatter of light, all surfaces not necessary for reflection or transmission of light are coated a dull, flat black.

Lamp 76 is retained in lamp housing 78 in engagement with contact 80. Metal terminals 82 are provided to contact batteries (not shown). A leaf spring switch 86 is fastened at one end 88 to the device housing and is actuated by push button 90 to close the circuit and light the lamp.

In operation, the device is held up to the eyes of the observer, so that he may look through eye apertures 46. Push button 90 is squeezed against housing 10 by the observer and lamp 76 lights and illuminates reticle patterns 58. The images of the illuminated reticle patterns are reflected by reflecting elements 48 to focusing lenses 42. These lenses permit focusing at any distance within the stereoscopic range and they image the pair of reticles at infinity. The adjustability of the parallactic separation of the images of reticle patterns 58 provides the distance measuring means. The images of the reticle patterns 58, projected by lenses 42 are reflected by the partially transmitting reflecting element 34 through eye apertures 46 to the observer's eyes.

Since reflecting element 34 also transmits light, and since lenses 42 focus the reticle image at infinity, the observer may see various objects or targets through reflecting element 34 simultaneously with the reflection of the reticle images. When a specific object is to be ranged, the knurled edge of cam plate 66 is rotated at the point where it is exposed in slot 44 until the stereoscopic reticle derived from the images of reticle patterns 58 appears to hover over the selected target or image. The distance or range can now be read directly on the cam plate 66 which is calibrated so that the sighted distance will be visible on the portion of the cam plate that lies within the surface of slot 47 opposite an index on panel 14 in slot 44.

The U-shaped reticle plate 54 is provided with dual reticle slots 58, but, due to the observer's stereoscopic vision, these two reticle images fuse, and he sees a single pattern floating in space. Rotation of cam plate 66 causes reticle plate 54 to move linearly and thereby causes the reflected images of the reticle patterns to appear to the observer to move toward or away from him. When both the reticle pattern and object appear to be in the same plane, the range is determined and is read directly on ranging cam 66 which has been suitably calibrated at 70.

Obviously, many substitutions of structure may be designed without departing from the scope of the invention. While reticle slots 58 are illustrated as being in a discontinuous line, the same effect is obtained by joining the lines to form a thin V-shaped slot on a circle. In this instance, lamp 74 can be positioned closer to partition 38 and so increase brightness of the reticle patterns. Also, reticle plate 54 could be used without guide block 72, in the event pin 62 meshed with groove 64 through a guide groove cut in the panel 14 and the cam plate were mounted on the exterior surface of panel 14.

Still another form of reticle and guide construction is illustrated in Fig. 9. Cam plate 100 is provided with spiral groove 102 and fastening means 104 and is similar in construction to the cam plate of Fig. 7. However, instead of guide block 72, a pair of spaced guide posts 105 and 106, for each individual reticle plate 108 and 110, are secured to bar 38. Reticles 108 and 110 are retained in track 102 by means of pins 112 and back cover 14. The proper linear travel of reticles 108 and 110 is taken into consideration when the pins are placed thereon. As will be noted from the figure, pin 112 of reticle 108 is closer to bar 38, than is the pin of reticle 110. In this manner, both reticle plates move simultaneously and in alignment when cam 100 is rotated.

In another use of a single reticle plate, the cam plate is mounted on the exterior of the housing. This form of invention is illustrated in Fig. 10. Front panel 114 is similar to panel 14 of the first embodiment and also includes semi-circular slot 116. Panel 114, however, is provided with an aperture or hole 118 to receive therein pin 120 projecting from cam plate or disc 122. Spiral groove 124, in cam plate 122, is similar in construction to groove 64. An elongated linear guide slot 126 in front panel 114 is adapted to slidably receive therein tongue member 128, depending from reticle plate 130. A pin follow 132 depends into cam track or groove 124. Reticle plate 130 is similar in construction to reticle plate 54. In assembly, cam plate 122 is secured to the housing on the exterior thereof by means of pin 118. Tongue 128, on reticle plate 130, extends into slot 126, pin follower 132 thereby extending into cam track 124. Cam plate 122 is suitably calibrated (not shown) and rotation thereof causes pin 132 to move in spiral track 124 and thereby move reticle plate 130 linearly. Tongue member 128 is shorter in length than slot 126, and thus is capable of linear movement within the boundaries of the slot. This insures retention of pin 132 within the limits of travel, since continued rotation of cam plate 122 might cause pin 132 to escape from the extremities of spiral track 124.

It is apparent that the several objects of the invention have been accomplished. By the use of a single illuminated reticle plate and solely by the use of two reflecting elements, the single reticle plate is made to present two reticles, one to each eye of the observer. And by the linking of the cam plate of the invention, with the single reticle plate to obtain direct linear motion, the two visual reticles maintain equal parallactic motion and the two reticle images appear to have equal and opposite motion toward or away from each other, depending upon the direction of movement of the reticle plate. In addition, the cam plate presents, in a single element, the means to read the ranges directly.

Obviously many modifications and variations of the present invention are possible in the light of the above teachings. It is therefore to be understood that within the scope of the appended claims the invention may be practiced otherwise than as specifically described.

What is claimed is:

1. In a stereoscopic ranging device, a housing, a dual reticle mounted in said housing, two viewing apertures within said housing whereby surrounding terrain can be viewed directly and said dual reticle images appear as one combined image, means mounted within said housing for superimposing said combined image upon a field of view, reflecting and lens means mounted within said housing and positioned between said reticles and said superimposing means, a means for altering predeterminedly the distance between said reticles and lens to alter the apparent position of said image upon said field of view, a cam plate having a spiral track rotatably secured in said housing, said dual reticles being spaced apart, having pin means riding in said track, rotative movement of said cam plate causing said reticles to move linearly, indicia on said cam and a source of light retained in said housing whereby the reticle is illuminated, wherein said reticles comprise a U-shaped member, the opposed arms of which contain the reticle, and a cross-piece connecting the arms, said cross piece retaining the cam pin on the back surface thereof, said cam pin riding in said track.

2. The combination of claim 1, wherein a transparent guide block member is secured to said housing, said reticle member moving linearly along said guide block as the cam disc is rotated.

3. In a stereoscopic ranging device, a housing, a dual reticle mounted in said housing for linear movement therein, two viewing apertures within said housing whereby the surrounding terrain can be viewed and said dual reticle images appear as one combined image, said housing including a thickened portion, grooves in said thickened portion and a partially transmitting element retained in said grooves whereby said partially transmitting element superimposes said combined image upon the field of view, reflecting and lens means mounted within said housing and positioned between said reticle and said superposition means, a ranging plate operative with said reticle members whereby rotation of said plate causes linear movement of the reticle members, a source of light to illuminate said reticle members, said ranging plate comprising a cam plate, a spiral track in said plate, and pin means extending from said reticle members into said track, wherein said reticles comprise a U-shaped member, the opposed arms of which contain the reticle, and a cross-piece connecting said arms, said cross-piece containing said pin.

4. The combination of claim 3, wherein a transparent guide block member is positioned within said U-shaped reticle member to guide the linear movement thereof.

5. The combination of claim 3, wherein said cam plate includes a securing pin extending into said housing, an elongated slot in said housing and a slidable member retained in said slot to provide linear movement for said reticle as the cam is rotated.

6. The combination of claim 5, wherein said slidable member comprises an elongated tongue follower extending into said slot, and said pin means depends from said tongue follower.

References Cited in the file of this patent

UNITED STATES PATENTS

| 911,001 | Folmer | Jan. 26, 1909 |
| 2,313,562 | Mainardi et al. | Mar. 9, 1943 |
| 2,397,273 | Land | Mar. 26, 1946 |
| 2,397,274 | Land | Mar. 26, 1946 |
| 2,411,160 | Martin | May 11, 1948 |
| 2,693,128 | Dewhurst | Nov. 2, 1954 |

FOREIGN PATENTS

| 612,859 | France | Aug. 9, 1926 |
| 765,535 | France | Mar. 26, 1934 |
| 512,903 | Germany | Nov. 20, 1930 |
| 437,444 | Great Britain | Oct. 28, 1935 |